United States Patent [19]

Meuret et al.

[11] Patent Number: 4,884,018

[45] Date of Patent: Nov. 28, 1989

[54] DEVICE FOR SUPPLYING ELECTRICITY AT A TEMPORARY OVERVOLTAGE TO AUXILIARY CIRCUITS OF AN AUTOMOBILE

[75] Inventors: Jean-Pierre Meuret, Noisy-le-Sec; Christian Ducrot, Creteil; Marcel Vogelsberger, Sceaux, all of France

[73] Assignee: Ducellier & Cie, Creteil, France

[21] Appl. No.: 53,133

[22] Filed: May 21, 1987

[30] Foreign Application Priority Data

May 23, 1986 [FR] France ................................. 86 07403
Oct. 16, 1986 [FR] France ................................. 86 14368

[51] Int. Cl.⁴ ............................. B60L 1/02; H02J 7/14
[52] U.S. Cl. ......................................... 322/8; 219/203; 320/37
[58] Field of Search .................. 322/7, 8; 320/37, 38; 219/202, 203

[56] References Cited

U.S. PATENT DOCUMENTS

| | | | |
|---|---|---|---|
| 3,469,073 | 9/1969 | Zechin | 320/64 X |
| 3,571,560 | 3/1971 | Nilssen | 219/202 X |
| 3,668,514 | 6/1972 | Peck | 322/28 |
| 3,868,558 | 2/1975 | Winkley et al. | 320/37 X |
| 4,084,126 | 4/1978 | Clements | 322/8 |
| 4,599,687 | 7/1986 | Smith | 320/1 X |
| 4,670,704 | 6/1987 | Machara et al. | 322/8 |

OTHER PUBLICATIONS

Japanese, vol. 7, No. 40 (E-159)-Patent Abstracts, 11/1982.

Primary Examiner—R. J. Hickey

[57] ABSTRACT

The invention relates to a device for supplying electricity at overvoltage in an automobile.

Automobile circuits comprise a main circuit (1) and an auxiliary circuit (2) requiring to be temporarily supplied at overvoltage. The main circuit is normally supplied by a battery (3) fed by an alternator (4) of which the excitation circuit is regulated by a regulator (5). In accordance with the invention, the device includes commutation means (6) controlled from the stator output of the alternator on the auxiliary load (2), the excitation of the alternator (4) following this commutation being taken via the regulator (5) to a sufficient value as a function of the state of the engine (M) for assuring a temporary supply state of the auxiliary circuits (2) at overvoltages and at reduced current.

Application to supply of electric circuits of automobiles or the like.

12 Claims, 5 Drawing Sheets

DEVICE FOR SUPPLYING ELECTRICITY AT A TEMPORARY OVERVOLTAGE TO AUXILIARY CIRCUITS OF AN AUTOMOBILE

FIELD OF THE INVENTION

The invention relates to a device for temporarily supplying electricity at overvoltage to auxiliary circuits of an automobile.

BACKGROUND OF THE INVENTION

Electric circuits of an automobile are usually supplied by a battery charged by an alternator of which the excitation current is regulated by a regulator. It is most often advantageous to subdivide the electric circuits of the automobile into a main circuit 1 and auxiliary circuits 2, the main circuit comprising the circuits for ignition, battery charging, heating, ventilation and lighting fed at substantially 14 volts, and auxiliary circuits comprising an array for rapid electric heating of the windshield, rear window, seats and infra red devices supplied at higher voltage, as a function of the rapidity sought. The supply at overvoltage of the mentioned circuits has of course a temporary character which will depend either on the timing attributable to the exterior temperature, or the temperature of cooling circuit of the automobile, or the action of the driver.

At present, the solutions proposed for assuring this supply consist either of providing a second stator winding in the alternator with an appropriate number of turns for providing the desired overvoltage or, from the alternating voltage delivered at 14 volts, to use a voltage raising transformer for supplying the auxiliary circuits.

The solutions mentioned have respectively the inconveniences in use of supplementary equipment, namely the transformer, which in fact operates for only a very small time, essentially from starting of the automobile until it and the engine are again at ambient temperature, and of the reduction of nominal power of the alternator when functioning normally from the presence of the auxiliary winding.

THE INVENTION

The present invention has the object of remedying the mentioned inconveniences by providing a device for supplying electricity at overvoltage for circuits of an automobile, in which no additional equipment is required in connection with the alternator.

Another object of the present invention is to provide a device for supplying electricity for an automobile, in which the alternator, although functioning in an overvoltage state, always functions at a power at least equal to its nominal power.

Another object of the present invention is further a device for supplying electricity for an automobile, in which the copper losses of the alternator, heating losses, are reduced although the alternator operates in the overvoltage state.

The device for supplying electricity temporarily to auxiliary circuits of an automobile according to the invention, the automobile having a principal circuit comprising a principal load supplied by a battery charged by an alternator of which the excitation current is regulated by a regulator. The supply device further comprises commutation means controlled from the rectified stator output of the alternator on the auxiliary load, the excitation of the alternator, following this commutation, being taken via the regulator to a sufficient value, as a function of the state of the engine, for ensuring a temporary supply state at overvoltage and reduced current for the auxiliary circuits.

The supply device according to the invention finds application, particularly, in the supply of electric circuits of any automobile or the like.

BRIEF DESCRIPTION OF THE DRAWINGS

The invention will be better understood from reading the following description and studying the drawings, in which.

EMBODIMENTS OF THE INVENTION

The device for supplying electricity for an automobile, in accordance with the invention, will now be described in connection with FIG. 1.

In accordance with this figure, the automobile is considered to have a main circuit 1, comprising a main load, particularly a main load being fed by a battery 3, charged by an alternator 4 of which the excitation current is regulated by a regulator 5, as previously described. The automobile comprises in addition auxiliary circuits, which in operation require to be submitted to a temporary supply at overvoltage. In FIG. 1, the auxiliary circuits are designated 2. Further, and as a reminder, it will be noted that the alternator is normally driven by an engine designated M.

In accordance with a supply device according to the invention, this comprising, in addition, means designated 6 for commutation controlled from the rectified output of the alternator 4 on the auxiliary load 2. The excitation of the alternator 4, following this commutation is taken, via the regulator 5 to a sufficient value as a function of the state of the engine M, for ensuring a temporary supply of the auxiliary circuits 2, at overvoltage and reduced current.

It will be understood that, on starting of the automobile the state of the engine M on start-up, corresponding to high normal engine speed because particularly of the start-up phase of the engine, under the influence of the air/gas mixture enriching systems, also known as the choke, the excitation control of the alternator, via the regulator 5, permits the obtaining of a supply of the auxiliary load 2 at overvoltage, at reduced current.

Figure 1:
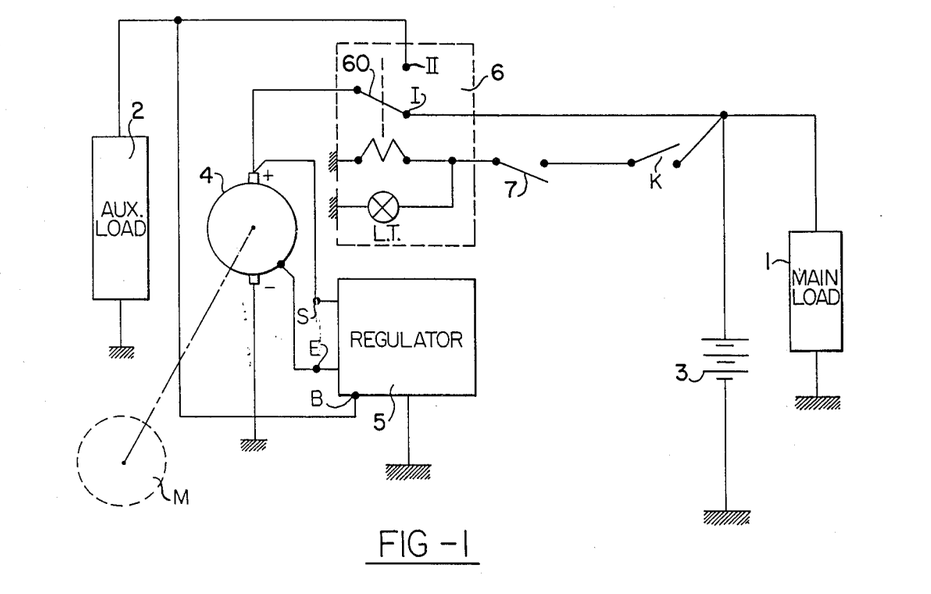
FIG. 1 shows a circuit diagram of a supply device according to the invention.

As further appears in FIG. 1, the commutation means 6 can be a relay 60 controlled by a switch 7. The switch 7 is normally connected to the battery 3, via the ignition switch of the automobile designated K. In accordance with the invention, the relay 60 ensures in a normally closed position, designated I in FIG. 1, the connection of the rectified stator output of the alternator 4 to the main load 1 and to the battery 3 and in the controlled position, designated II in FIG. 1, the connection of the rectified stator output of the alternator 4 to the auxiliary load 2.

Also as further appears in FIG. 1, the controlled relay 60, further ensures when in the controlled position designated II, the connection of the rectified stator output of the alternator 4 to a control input for excitation B of the regulator 5. It will be noted that the control input B of the regulator 5 is connected directly to the transfer contact of the controlled position II of the relay 60. Thus, the relay 60 is taken from the normal rest position I, the position in which the normal supply of the main load 1 is ensured by the alternator and the battery 3 to be a nominal voltage of 14 volts, into controlled position II in which the auxiliary circuit 2 is supplied at overvoltage and at reduced current, the main load 1 being disconnected.

Figure 2:
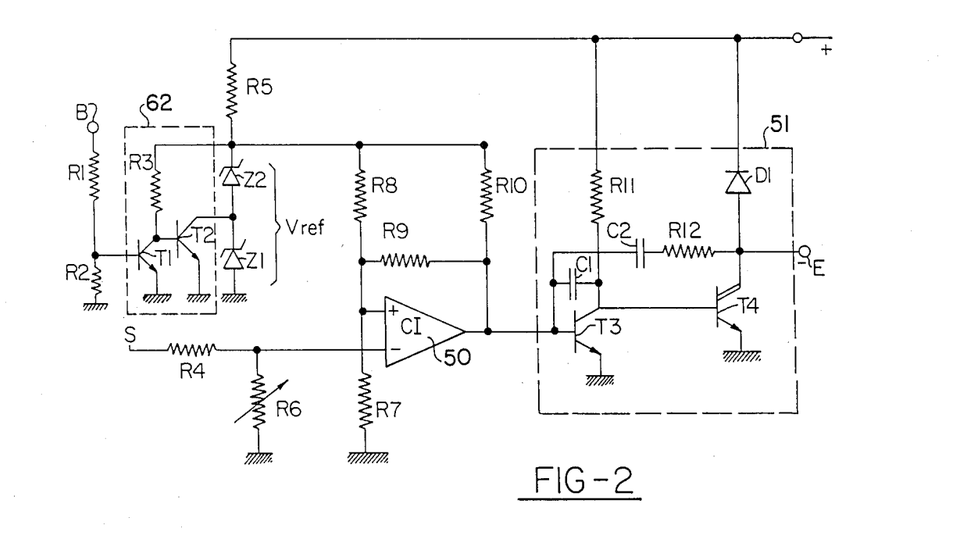
FIG. 2 shows an advantageous embodiment of a regulator able to be used in the supply device shown in FIG. 1.

A more detailed description of a regulator 5 for use with the embodiment of the supply device such as shown in FIG. 1, will not be given in connection with FIG. 2.

In FIG. 2, one will observe that the regulator comprises a comparator circuit 50, of which a first negative input, comprising an input designated S of the regulator, is connected to the rectified stator output of the alternator 4 via a resistance designated R4. A second positive input of the comparator 50 is connected to a first reference voltage designated Vref in FIG. 2. current generator means designated 51 are controlled by the comparator circuit 50, these current generator means having an output designated E, the excitation output, directly connected to the excitation contact of the alternator. The regulation of voltage of the alternator is accomplished due to the input S of the regulator connected to the positive output of the alternator. By positive output of the alternator, one will understand that the output of the alternator under consideration corresponds to the rectified voltage delivered by the alternator. As further shown in FIG. 2, the regulator 5 also comprises an excitation control input B, connected to the relay transfer contact ensuring in controlled position II the connection of the alternator stator output 4 to the auxiliary load 2. The excitation control input B of the regulator 5 is connected to the reference voltage of the comparator circuit, the reference voltage designated Vref, via a commutation circuit designated 62. The commutation circuit 62 comprises two transistors designated T1 and T2 connected in cascade, the transistor T2 being connected to the common point of two Zener diodes designated Z1 and Z2 which provide the reference voltage Vref.

The current generator means 51 comprises two transistors connected in cascade, a transistor designated T3 and a transistor designated T4, the transistor designated T4 functioning as a curent generator. The positive input of the comparator circuit 50 is connected to the reference voltage Vref, via a resistance circuit designated R8,R9,R10,R7 as shown in FIG. 2. The regulation of voltage, when the commutation circuit 6 in the controlled position II, is effected in the following manner. The input B of the regulator is connected to the positive output of the alternator, that is, the rectified alternator stator voltage which voltage is connected to the comparator circuit 50 via the resistance bridge R4,R6. The resistance R6 permits adjustment of the supply voltage in the conventional nominal state, to a convenient value, for example 14.5 volts. The excitation control input B corresponds to the information input permitting the indication of the engagement of the relay 60 in the controlled position II. Thus, when the relay is at rest, position I, the input B is connected to earth via the auxiliary load 2, the transistor T1 is nonconductive and the transistor T2 is saturated. The previously described conduction state of the transistors T1 and T2 permits, via the Zener diodes Z1 and Z2 by the transistor T2, establishment of a reference voltage, which is applied by the divider bridge R8,R7 to the positive input of the comparator 50. The resistance R9 permits obtaining the desired hysteresis for obtaining the correct regulation curves from the point of view of their slope, the values of the resistances R12 and of the capacities C1,C2 of the current generator means 51 also being chosen with the same end in view. When the relay 60 is engaged, the relay being in the controlled position II, the potential at voltage the input B increases, which permits the transistor T1 to become saturated and cause transistor T2 to become nonconductive. The reference voltage at the positive input of the comparator is thus modified, whilst because the transistor T2 is nonconductive, the Zener diode Z1 is maintained in conduction. The regulation voltage in the position II must always be greater than the conventional nominal voltage allowing the regulation voltage to increase to a value in the order of 42 volts, or substantially three times the nominal voltage of the alternator. The indicator light L.T. for the commutation means 6 or relay 60, permits indication of the functioning of the supply device according to the invention, in the oversupply state. The latter, as a function of the external use conditions of the automobile, will be able by the sole operation of the control switch 7, either to control the engagement of the relay in the controlled position designated II, if necessary, or the relay 60 in position II, control of switch 7 return the relay 60 into the rest position I to recharge the battery 3 at the nominal voltage of the alternator. According to a non-limitative variant of the regulator 5 which can be used in the supply device embodying the invention, the input S as described in FIG. 2, is connected to the positive output of the alternator 4, via a high value resistance in which case the excitation control input B of the regulator is not required, as well as the commutation circuit 61. The reference voltage Vref being connected by a single Zener diode voltage value, suitably chosen to provide Vref. In this case, the functioning of the regulator is analagous to the functioning previously described.

Figure 3:
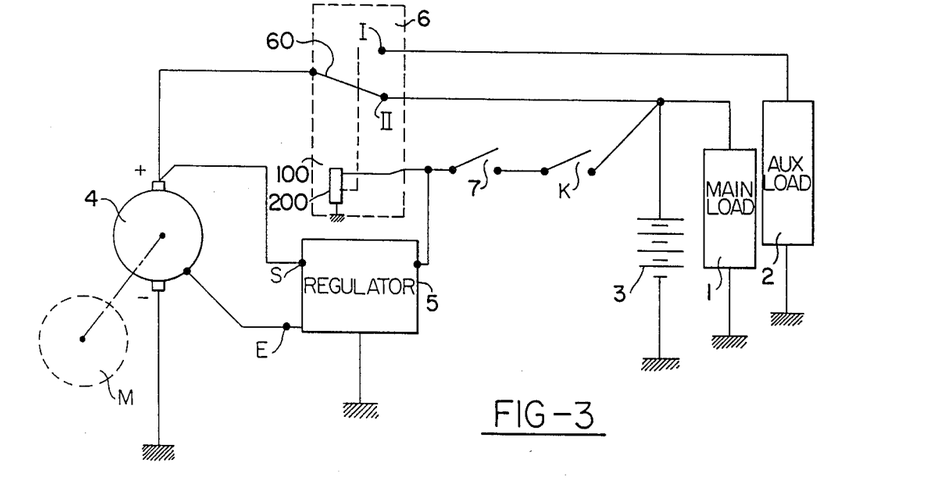
FIG. 3 shows a variant of the advantageous embodiment of the supply device according to the invention, in which an automatic control of the commutation to the overvoltage state is effected as a function of external parameters.
Figure 4A:
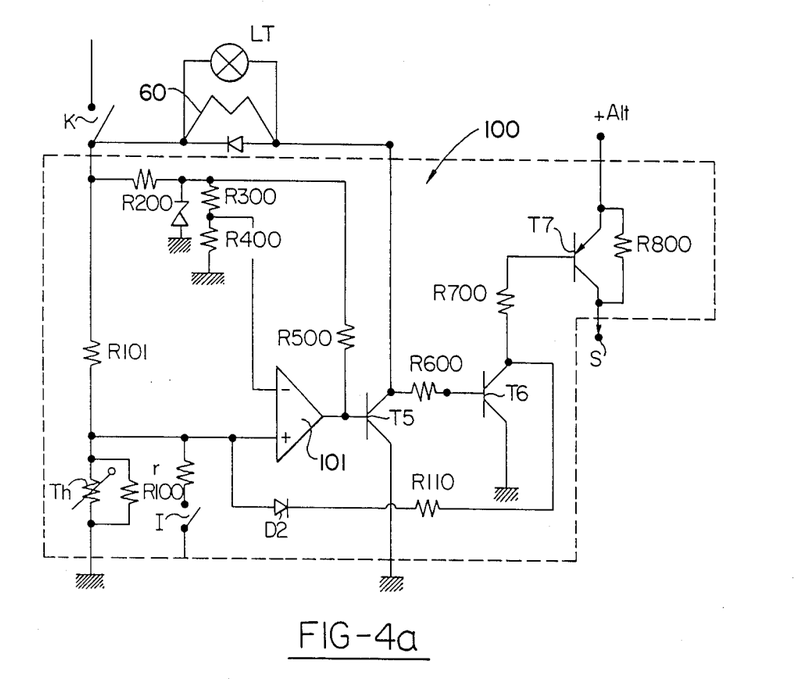
FIG. 4a and FIG. 4b show circuit diagrams of electronic circuits used in the case of the device shown in FIG. 3, the parameters being constituted for example by the temperature of the cooling circuit of the automobile and a delay of return to the nominal supply state.
Figure 4B:
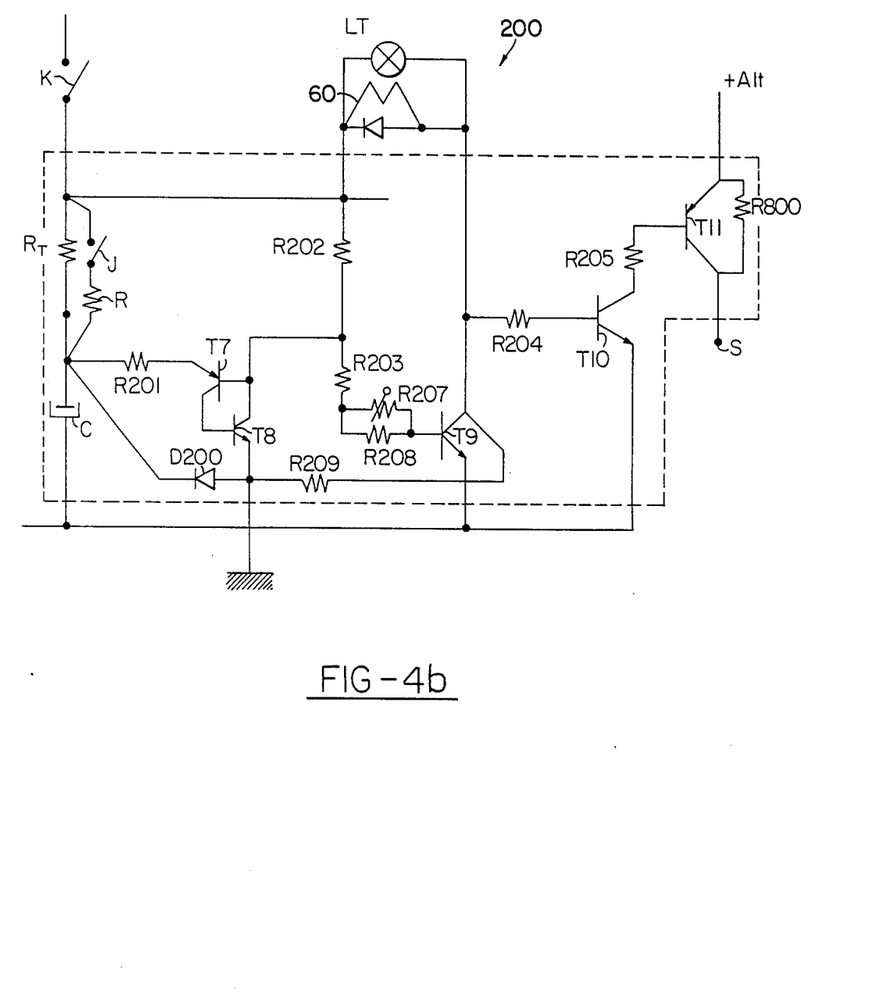

Referring to FIGS. 3, 4a and 4b, an advantageous embodiment of the supply device according to the invention, in which an automatic control of the commutation in overvoltage is effected in accordance with external parameters of functioning of the automobile, such as for example, the temperature of cooling circuits or a delay for return of the relay 60 into the rest position after engagement by the driver by means of the switch 7 will now be described.

In accordance with FIG. 3, the commutation means 6 further comprises a temperature detector designated 100 for the cooling circuit of the vehicle. In FIG. 3, the temperature detector designated 100 has been shown symbolically by a functional block connected directly between the positive contact of the alternator 4 and the input S of the regulator through. The detector 100 in accordance with the temperature detected is adapted in a manner to ensure throughout a range of temperature values the commutation of commutation means 60 to an oversupply position for the auxiliary load 2.

The temperature detector 100 shown schematically in FIG. 3, will now be described in more detail in connection with FIG. 4a.

In FIG. 4a, it will be noted that the temperature detector 100 comprises by way of example, a comparator 101, which has a reference voltage connected to its negative input, and a voltage representative of the temperature of the cooling circuit of the automobile connected to its positive input. The comparator circuit 101 controls a first commutation transistor designated T5 which is connected in a common emitter configuration, and in which the collector is loaded for example by the winding of the commutation to relay 60 to operate the relay into the commutation positions II and the rest positions I previously described. Further, the transistor T5 is connected in cascade to two transistors T6 and T7, the transistors T6 and T7 being for example complemented transistors. The transistor T6 is for example connected as a common emitter and the transistor T7 is intended to ensure by commutation the short-circuit of a resistance designated R800, normally connected between the positive terminal of the alternator 4 and the input S of the regulator. A resistance variable in accordance with the temperature, resistance designated TH in FIG. 4a, detects the temperature of the cooling circuit of the automobile. This element is placed in a resistive bridge designated R101,R,R100, in FIG. 4a. The resistance variable in accordance with the temperature permits comparison of a voltage function of this temperature and representative of this to a reference voltage given by a Zener diode and by a resistive bridge R300,R400 in FIG. 4a. The functioning of the temperature detector described in the mentioned figure is the following:- on starting, the transistor T5 is saturated and the transistor T6 is non-conductive, which permits modifying of the regulation of the regulator due to the resistance R800 positioned in series with the input S of the regulator. The relay 60 is under voltage and is operated to controlled position designated II. The auxiliary load 2 is then supplied at overvoltage. The light designated L.T.1 signals this function. When the temperature of the cooling circuit reaches a predetermined value, the system changes and remains in this position due to the counter-reaction circuit or locking comprised of the resistance 110 and the diode designated D2 to form the connection between the collector output of the transistor T6 and the positive input of the comparator circuit 101. The transistor T5 is then blocked whilst the transistor T6 is itself saturated which then permits from the operation of the relay 60 to the rest position designated I, the conventional supply of the main circuit 1 and of the battery 3 by the alternator under the nominal voltage of substantially 14 volts. A short-circuit circuit designated r,I of the temperature detection sensor 100 connects through the operation of the switch I the positive input of the comparator 101 to the reference voltage and thus to ensure the return of the relay 60 into the rest position designated I to recharge the battery 3 by the alternator 4 under the nominal voltage.

As has already been indicated in connection with FIG. 3, the commutation means 60 may include delay means 200 for the opening of the control of the commutation means. Delaying the opening of the control of the commutation means 60 delays the return of the commutation relay 60 to its rest position designated I after a pretetermined time. The delay means 200 will be described in more detail in connection with FIG. 4b. In this FIGURE, the delay means 200 comprise a resistance/capacitance circuit, resistance designated RT, capacitance C. The resistance/capacitance circuit RT, C, is connected to the ignition switch K and supplied by the battery 3, via the switch K. On closing of the ignition switch K, a delay is engaged, a delay consisting of the load of the capacitance C across the delay resistance RT. The relay 60 is then operated via T9, which non conducts causing the relay 60 operate to the controlled pposition designated II to power, the auxiliary circuit 2 with a voltage in the region of 42 volts. In this situation, the transistor T9 is saturated and operates the relay 60 with the transistor T10 and the transistor T11 being non-conductive. The light L.T.1 signals the operation of the relay 60. When the voltage across the delay capacitor C reaches the value of the voltage fixed by the polarisation bridge for the base of the transistor T9 comprising, resistance R202,R203 and R207 in parallel with the resistance R208 and the system of transistors T7,T8, discharge the delay capacitor C and cause the transistor T9 to become non-conductive. The system is then locked in this situation, the transistor T9 being blocked due to the resistance circuit 209, diode D200. In this situation, the relay 60 is then no longer excited and the resistance R800 is short-circuited by the transistor T11 to the saturated state which now permits supply of the battery under the nominal voltage of the alternator 4. This delay can advantageously be rendered sensitive to the external temperature through the temperature sensitive resistance R207. Further the circuit comprising the switch J and the resistance k connected in series permits, by the short circuit of the delay resistance RT, the suppression of operation of the delay means and the direct charging of the battery 3 causing the relay 60 to remain indefinitely in the rest position designated I.

It will be noted that the control of the commutation means 6 by the switch 7 is at least functionally coupled to means for accelerating the engine M, these acceleration means being able to be provided in a manner known in itself, a manual accelerator, an air/gas mixture enrichment control such as an automatic or semiautomatic choke, or indeed the accelerator pedal or the like.

Figure 5:
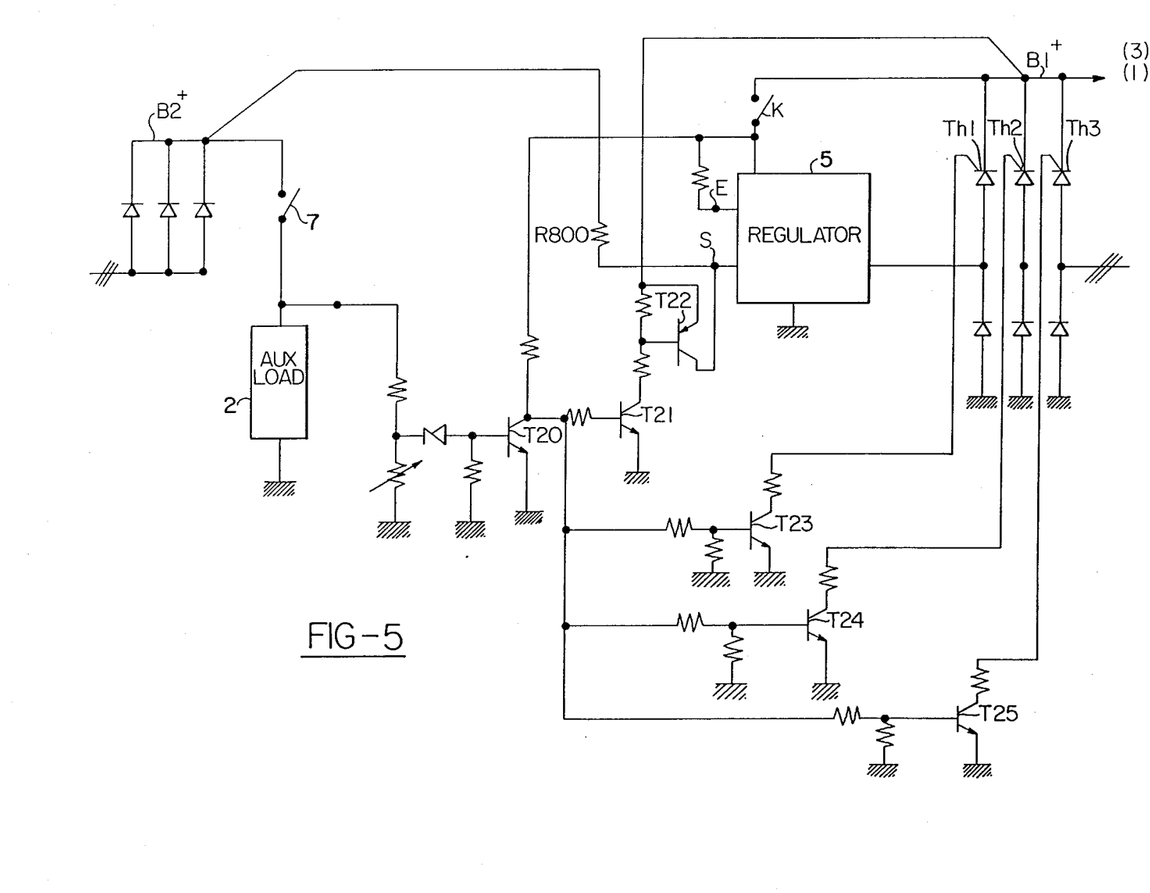
FIG. 5 shows a circuit diagram of the overvoltage supply device according to the invention, in the case where the continuous voltage delivered by the alternator, after rectification, is available via a first semi-bridge and a second semi-bridge each respectively supplying the main load and the auxiliary load.

An advantageous non-limitative embodiment of the device for supplying overvoltage according to the invention will now be described with reference to FIG. 5 in the case where the continuous voltage delivered by the alternator, after rectification, is available via a first semi-bridge designated B1 for supplying voltage to the main load 1 and a second semi-bridge B2 for supplying voltage to the auxiliary load 2. In the embodiment mentioned, it will be noted that the commutation means 6 provided by the relay 60, as already described, are replaced by thyristors designated TH1,TH2,TH3, which replace the normal diodes of the positive semi-bridge B1 of the alternator 4, and which thyristors disconnect the supply to the terminal B1 to supply battery 3 to the main load 1, whilst the control function is triggered after operation of the ignition key designated K and of the control switch 7. In this same FIG. 5, it will be noted that the switch 7 is now connected to the terminal B2 of the second positive semi-bridge of the alternator and directly supplies the auxiliary load 2. Operation of the switch 7 by the driver of the automobile cause the supply at temporary overvoltage to the auxiliary load 2, the commutation circuits comprising the transistors T20,T21 and T22 transmit a voltage signal to the auxiliary load 2 at the input of the regulator 5. By an analogous functioning of this, the available excitation current at the excitation outlet E of the regulator 5 is increased to a sufficient value to cause the alternator 4 to operate in the overvoltage state. Simultaneously, the commutation signal delivered by the transistor T20 controls three trigger transistors designated T23,T24,T25, which are connected to the trigger electrodes of the thyristors TH1,TH2,TH3, permitting the switching off of the thyristors, and the disconnection of the battery 3 and the main load 1 from the supply circuit comprising the first positive semi-bridge B1 which now provides an overvoltage.

This embodiment controlled by thyristors has the advantage of thus limiting the number of necessary connections for providing the device as previously described.

A device has already been described for the supply of electricity to auxiliary circuits of an automobile temporarily at overvoltage with particularly good performance, the performance characteristic appearing noteworthy, as a result of the diversity of possibilities of automatic control of the supply device in accordance with the invention as well as the electrical performances of it. It will be noted in fact that in the case of use on starting of the engine of the automobile, particularly in conditions of extremely low exterior temperatures, the circuits for de-icing the rear window and the windshield, for example, requiring to be oversupplied during a relatively brief time, the supply device such as previously described permits for a functional state of the engine in the situation of control of the latter by the choke, a functional state substantially corresponding to 2000 revs per minute, a supply at overvoltage. The supply state at overvoltage of the supply device in accordance with the invention can easily and without inconvenience be established at a supply below 42 volts, or substantially three times the nominal voltage of the alternator, the supply's current can then be reduced to 80% of the nominal value for example. In this case, it will then be noted from the reduction of the nominal current, the copper losses in the alternator, heating losses, are substantially reduced whilst the effective power delivered to the auxiliary circuit 2 is for example multiplied by a factor of the order of 3.

Figure 6:
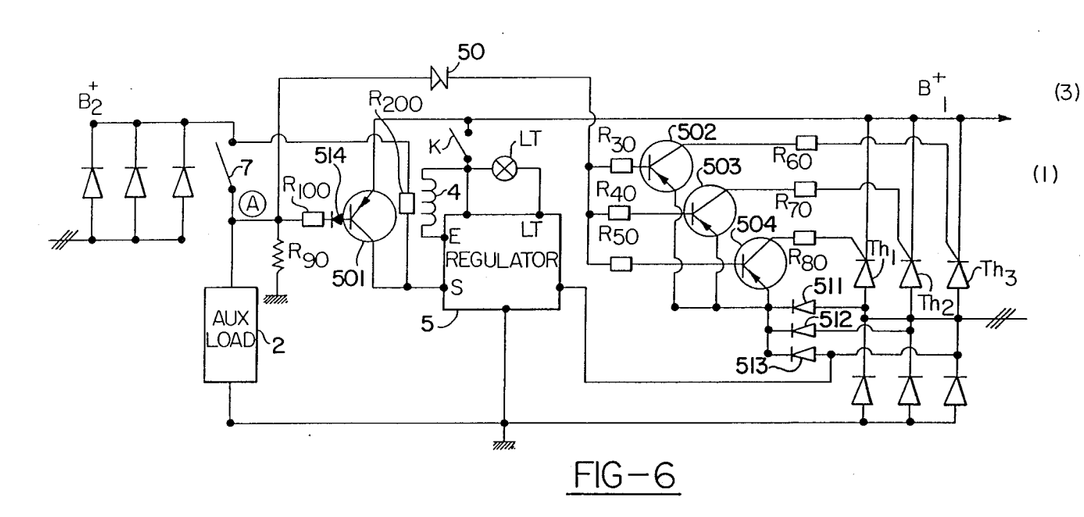
FIG. 6 shows a particular embodiment of the device for supply at overvoltage in accordance with the invention, more particularly adapted in order to ensure a disconnection of supply at overvoltage of the auxilairy load, the risks of interaction between the means for supply of the main load and the auxiliary load being suppressed.

The embodiment shown below in FIG. 6 is a particular embodiment of a temporary supply device for auxiliary circuits of an automobile in accordance with the object of the present invention.

The present embodiment has the object of a particular embodiment of the device described previously in the description, this embodiment being particularly adapted to assure a disconnection of supply in the overvoltage state of the auxiliary load, the risks of interaction between the main load supply means and the auxiliary load being suppressed.

According to the embodiment shown in FIG. 6, the temporary electric supply device for auxilairy circuits of an automobile also comprise a main circuit supplied by a battery charged by an alternator of which the excitation current is regulated by a regulator as described previously in the description.

The commutation means are controlled from the stator output of the alternator to the auxiliary load and which commutation means comprise thyristors mounted in the positive rectifying semi-bridge of the alternator. Each of the thyristors is controlled by a control transistor of which the collector electrode is then connected to the triggering electrode of the corresponding thyristor and of which the emitter electrode is connected by at least one diode to the input terminal of the alternator for the rectifier bridge. The base electrode of the transistors is connected in parallel via a Zener diode to the control switch 7.

The invention will be better understood from reading the description and studying FIG. 6 which shows an electric circuit for the corresponding embodiment.

In the mentioned FIG. 6, the same references represent the same elements as in the preceding description.

Thus in FIG. 6 are shown the auxiliary load 2 supplied by the semi-bridge $B_2+$ via the control switch 7 the regulator 5 of which the terminal E is connected to the excitation winding of the alternator 4 and the terminal S is connected to the positive output of the alternator delivered by the rectifying semi-bridge $B_2+$. The ignition key K of the automobile permits the switching on of the device and the detection of functioning in the supply state or of the non-supply of the auxiliary load via the indicator lamp LT.

As is further shown in the mentioned FIG. 6, the commutation means controlled from the stator output of the alternator to the auxiliary load 2 comprise thyristors designated TH1,TH2,TH3, which are mounted in the positive rectifying semi-bridge $B_1+$ of the alternator.

Each of the mentioned thyristors is controlled by a control transistor designated 502,503,504, of which the collector electrode is via R60,R70,R80 connected to the triggering electrode of the corresponding thyristor, and of which the emitter electrode is connected via one of a trio of diodes designated 511,512,513 to the alternator input contact of the rectifier bridge $B_1+$. The base electrode of the control transistors 502,503,504 is connected in parallel via a Zener diode designated 50 to a supply control switch 7.

As further appears in the mentioned FIG. 6, the input S of the regulator 5 is connected on the one hand to the output $B_2+$ of the rectifying semi-bridge supplying the auxiliary load 2 via the polarisation resistance R200 and to the control switch 7 for supply of the auxiliary load 2, via a transistor 501 of which the emitter electrode is directly connected to the contact $B_1+$ of the rectifying semi-bridge of the alternator and of which the collector electrode is directly connected to the input S of the regulator 5. The base electrode of the transistor 501 is connected to the control switch 7 of the auxiliary load via a diode 514 and of a polarisation circuit inducting the resistances R100 and R90 as shown in the mentioned FIG. 6.

The functioning of the device shown in FIG. 6 is the following:

On starting of the automobile, the user switches on the device by means of the ignition key designated K.

In the absence of switching on the overvoltage supply to the auxiliary load 2 such as the control switch 7 being held open by the user, the transistor 501, a transistor of the PNP type for example, is in a saturated state because of the raising to reference potential of the voltage at the base of this transistor, via the resistances R100 and R90. The emitter-collector voltage of the transistor 501 is then the saturation voltage and the input S of the regulator is directly connected to the potential $B_1+$ through the saturated transistor.

In the same manner, the control transistors 502,503,504 are saturated, the base electrodes of these transistors are taken to the reference potential via the resistance 90 and the polarisation resistances respectively R30,R40, and R50. The control transistors 502,503,504 also of the PNP type, are then saturated, which permits the conduction of the thyristors TH1,Th2,TH3 due to the conducting current to the respective control electrode of these thyristors, via the polarisation resistances R60,R70,R80. The rectifying bridge $B_1+$ ensures then the supply of the normal load 1 and of the battery 3.

When the driver operates the control switch to supply the auxiliary load 2, the potential at point A, the junction point of the resistance 100 and the resistance 90, becomes equal to the voltage delivered by the alternator after rectification which has the effect of turning off the transistors 501,502,503,504. The input S of the regulator 5 is then fed via the resistance R200 which is connected to the output $B_2+$ which powers the auxiliary load 2. The voltage applied to the input S is then the voltage delivered by the rectifier semi-bridge $B_2+$ increased by the ratio to the regulation voltage previously delivered to the rectifier bridge of the alternator $B_1+$. The voltage can thus be, for example, increased from 14 volts to 42 volts.

The cut off state of the transistors 502,503,504 has the effect of turning off the corresponding thyristors TH1,TH2,TH3. The rectifier bridge $B_1+$ is thus disconnected and no longer supplies the load of the main circuit 1 and the battery 3. This has the effect of favouring the supply of the auxiliary load 2 with rapid charge via the rectifying semi-bridge $B_2+$. The Zener diode 50 prevents any possible conduction of the thyristors TH1,TH2,TH3 after turn-off conduction will be caused by the differences in voltage drop of the diodes 511,512,513 connecting the emitters of the transistors 502,503,504 to the input terminals which connect to the rectifier bridge of the alternator $B_1+$ and to the terminals (anodes) of the power diodes comprising the rectifier semi-bridge $B_2+$.

On reopening of the control switch 7 the functioning of the device as previously described returns, and the situation of normal battery charge under nominal voltage is established.

The resistance R90 permits in case of cutting a rapid charge or supply to the auxiliary load 2 ensuring an equal voltage to the nominal voltage, on the battery 3, when the switch 7 is open. The diode 514 connected between the base electrode of the transistor 501 and the resistance 100 protects the base emitter junction of the transistor 501 from reverse voltage whilst the control switch 7 is closed.

There has thus been described a device for temporary supply of electricity to auxiliary circuits of an automobile, of which the main circuit comprises a main load supplied by a battery, performing particulary well taking account of the fact that the commutation means for supply of the auxiliary load and of the main load are completely separate with no interaction between the supply of the auxiliary load and of the main load.

We claim:

1. A device for providing a temporary overvoltage to an auxiliary electrical circuit load in an automobile, the automobile having an engine and a main electrical circuit including a main electrical circuit load, a battery for supplying electrical current to the main electrical circuit at nominal voltage magnitude, an alternator coupled to the engine and having a rectified stator output voltage for charging the battery, said device comprising:

voltage regulation means including an excitation voltage output coupled to the alternator for providing control excitation current to the alternator to control the magnitude of the alternator output voltage, said voltage regulation means including a control voltage input;

commutation means coupled to the alternator rectified stator output and having two operative conditions for connecting the alternator stator output to the battery when in its first operative condition and to the auxiliary electrical circuit when in its second operative condition, said commutation means further connecting the alternator stator output to said control voltage input of said voltage regulation means when in its second operative condition to cause said voltage regulation means to produce said control excitation current to increase the magnitude of the rectified stator output voltage whereby said auxiliary electric circuit load is powered at an overvoltage and reduced current generated by the alternator, and control means coupled to said commutation means for operating said commutation to one or the other of its first and second operative conditions.

2. A device according to claim 1 wherein said commutation means includes a relay controlled by a switch.

3. A device according to claim 1 wherein said voltage regulation means comprises:

a comparator circuit a first negative input comprising an input of said regulator and being connected to said alternator stator output via a resistance and having a first positive input connected to a reference voltage, and current generator means coupled to and controlled by said comparator circuit, said current generator means having an excitation output directly connected to an excitation contact of said alternator.

4. A device according to claim 2, comprising:

a comparator circuit having a first negative input comprising an input of said regulator and being connected to said alternator stator output via a resistance and having a first positive input connected to a reference voltage, current generator means coupled to and controlled by said comparator circuit, said current generator means having an excitation output directly connected to an excitation terminal of said alternator, and wherein said regulator further includes said voltage input connected to a terminal of said commutation relay whereby connection is made between said stator output of said alternator and said auxiliary load when said relay is in its second operative condition.

5. A device according to claim 4 further including commutation transistors for connecting said excitation control input to said reference voltage of said comparator circuit.

6. A device according to claim 1, wherein said commutation means further comprises a temperature sensor of a cooling circuit of said automobile coupled to said commutation means to cause said commutation means to operate to its second operative condition in response to sensing a temperature in a range of temperature.

7. A device according to claim 1, wherein said commutation means further includes delay control means for operating said commutation means.

8. A device according to claim 1 wherein said control means includes a switch said switch being coupled to the engine acceleration means including a group comprising a manual accelerator, an air/gas mixture enrichment control, an automatic or semi-automatic choke, an accelerator pedal.

9. A device according to claim 1, wherein said commutation means further comprises thyristors connected in a positive semi-bridge circuit arrangement and connected to of the alternator output for supplying said battery and said main load.

10. A device according to claim 1 wherein said commutation means comprises a plurality of thyristors connected to the stator output of the alternator to connect and disconnect the battery to and from the alternator during the time corresponding to the generation of a nominal voltage and overvoltage condition, respectively, each of said thyristors having a gate, cathode and anode terminal and being controlled by a respective control transistor, each transistor having an emitter, base and collector terminal, said thyristors being arranged in a positive rectifying semi-bridge circuit arrangement with the anode of a said thyristor being connected to at least a one diode associated with the alternator wherein said at least a one diode comprises a rectifier bridge of the alternator, each of said control transistors having their respective base terminals coupled in parallel to one another, voltage threshold switch means coupled between said control means and said parallel coupled base terminals, said voltage threshold switching means becoming conductive upon the operation of said control means causing said control transistors to become conductive and said thyristors to become non-conductive whereby the battery and main electrical circuit load are disconnected from the stator output of the alternator.

11. A device according to claim 10 wherein said control voltage input of said voltage regulation means is coupled to said control means, said control means comprising a transistor switch having a base, emitter and collector terminals, said emitter being connected to the cathode of at least one of said thyristors, said collector being connected to said control voltage input and said base being coupled to one end of a switch comprising said control means whereby operation of said switch couples the stator output voltage to said auxiliary electrical circuit and to said control voltage input whereby said voltage regulation means causes the alternator to provide an overvoltage to said auxiliary electrical circuit.

12. A device according to claim 11 wherein said base is coupled to said switch through a diode and a polarization circuit.

* * * * *